(12) United States Patent
Wang et al.

(10) Patent No.: US 10,127,116 B2
(45) Date of Patent: Nov. 13, 2018

(54) RECOVERY OF SUBSCRIBER DATA IN MOBILE COMMUNICATION NETWORKS

(71) Applicant: AT&T Intellectual Property I, L.P., Atlanta, GA (US)

(72) Inventors: Wei Wang, Weehawken, NJ (US); Cristina Serban, Middletown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 66 days.

(21) Appl. No.: 14/811,362

(22) Filed: Jul. 28, 2015

(65) Prior Publication Data

US 2017/0031777 A1    Feb. 2, 2017

(51) Int. Cl.
*G06F 11/00* (2006.01)
*G06F 11/14* (2006.01)
(Continued)

(52) U.S. Cl.
CPC ...... *G06F 11/1464* (2013.01); *G06F 11/1451* (2013.01); *H04W 8/30* (2013.01); *H04W 24/02* (2013.01)

(58) Field of Classification Search
CPC .. G06F 11/1451; G06F 11/1464; H04W 8/04; H04W 8/12; H04W 8/30
(Continued)

(56) References Cited

U.S. PATENT DOCUMENTS 5,953,662 A    9/1999  Lindquist et al.

6,788,936 B1*  9/2004  Rune ............... H04W 24/04
                                              455/432.1
(Continued)

FOREIGN PATENT DOCUMENTS

CN    102395121    6/2014
EP    1030529      8/2000
(Continued)

OTHER PUBLICATIONS

Abdelgwad, A. O., D. S. Ahmed, and A. I. Saleh. "A reliable-double edged strategy for HLR mobility database failure detection and recovery in PCS networks." Networking and Media Convergence, 2009. ICNM 2009. International Conference on. IEEE, 2009 (2 pages).
(Continued)

*Primary Examiner* — Elmira Mehrmanesh
(74) *Attorney, Agent, or Firm* — Hanley, Flight & Zimmerman, LLC

(57) ABSTRACT

Methods, apparatus, systems and articles of manufacture (e.g., physical storage media) to recover subscriber data in mobile communication networks are disclosed. Example subscriber data recovery methods disclosed herein include communicating with mobile devices operating in a mobile network to configure the mobile devices to (1) locally store backup subscriber data corresponding to subscriber data maintained at a first network element to manage access to the mobile network and (2) transmit the backup subscriber data to a destination based on configuration data. Disclosed example methods also include queueing respective backup subscriber data received from respective ones of the mobile devices for transmission to at least one of the first network element and/or a second network element to restore the subscriber data maintained at a first network element.

17 Claims, 12 Drawing Sheets

(51) Int. Cl.
*H04W 8/30* (2009.01)
*H04W 24/02* (2009.01)

(58) Field of Classification Search
USPC .......................................................... 714/15
See application file for complete search history.

(56) References Cited

U.S. PATENT DOCUMENTS

| | | | |
|---|---|---|---|
| 6,944,662 | B2 | 9/2005 | Devine et al. |
| 7,013,139 | B1 | 3/2006 | Gan et al. |
| 7,366,945 | B2 | 4/2008 | Wang et al. |
| 7,827,142 | B2 | 11/2010 | Silfverberg et al. |
| 7,936,665 | B2 | 5/2011 | Ishii |
| 8,032,180 | B2 * | 10/2011 | Choi ................... H04N 7/163 455/3.01 |
| 8,116,787 | B1 * | 2/2012 | Lektuai ................ H04W 28/18 370/331 |
| 8,126,432 | B2 * | 2/2012 | Cardina ............... H04W 12/12 455/26.1 |
| 8,145,211 | B2 | 3/2012 | Fouquet |
| 8,560,890 | B2 * | 10/2013 | Belinchon Vergara ........................ H04L 29/06027 714/20 |
| 8,812,614 | B2 | 8/2014 | Welingkar et al. |
| 8,923,846 | B2 | 12/2014 | Phan-Anh et al. |
| 9,021,300 | B2 | 4/2015 | Le Rouzic et al. |
| 9,026,675 | B2 | 5/2015 | Merino Vazquez et al. |
| 2004/0235523 | A1 | 11/2004 | Schrire et al. |
| 2008/0162410 | A1 | 7/2008 | Montpetit et al. |
| 2009/0307284 | A1 * | 12/2009 | Welingkar ........... G06F 11/1451 |
| 2011/0211527 | A1 * | 9/2011 | Agarwal .............. H04L 61/1588 370/328 |
| 2011/0300862 | A1 * | 12/2011 | Munoz Munoz .. A41D 13/0025 455/433 |
| 2012/0207015 | A1 * | 8/2012 | Marsico ............. H04L 41/0663 370/221 |
| 2012/0281621 | A1 | 11/2012 | Lotfallah et al. |
| 2014/0248869 | A1 | 9/2014 | Chen et al. |
| 2015/0156628 | A1 * | 6/2015 | Guan ..................... H04W 8/28 455/418 |
| 2015/0215773 | A1 * | 7/2015 | Bai ....................... H04W 8/183 455/418 |

FOREIGN PATENT DOCUMENTS

| | | |
|---|---|---|
| WO | 98/15131 | 4/1998 |
| WO | 99/53702 | 10/1999 |
| WO | 00/24216 | 4/2000 |

OTHER PUBLICATIONS

European Telecommunications Standards Institute, "Digital cellular telecommunications system; Restoration procedures (GSM 03.07)", SGM Technical Specification, Version 5.0.0, Nov. 1996 (15 pages).

Halliday, Josh, et al, "O2 network 'fully restored' after 24-hour blackout", The Guardian, theguardian.com, Jul. 12, 2012 (3 pages).

Hewlett-Packard Development Company, L.P., "Keeping your subscribers continuously connected", Solution brief, Apr. 2015 (2 pages).

Taleb, Tarik, et al., "Ensuring Service Resilience in the EPS: MME Failure Restoration Case", NEC Laboratories Europe, Global Telecommunications Conference, IEEE, 2011 (5 pages).

Alcatel Lucent, "LTE Subscriber Service Restoration: Methods to Maintain User Sessions in the Face of MME/SGW Node Events", Application Note, tcmnet.com, 2014 (10 pages).

\* cited by examiner

RECOVERY OF SUBSCRIBER DATA IN MOBILE COMMUNICATION NETWORKS

FIELD OF THE DISCLOSURE

This disclosure relates generally to communication networks and, more particularly, to recovery of subscriber data in mobile communication networks.

BACKGROUND

Modern mobile communication networks include network elements that maintain subscriber data associated with mobile devices. This subscriber data is used for many purposes, such as, but not limited to, determining whether to allow a given mobile device to access the mobile network and, if so, under what parameters (e.g. such as parameters specifying the services, data rates, billing rates, etc., associated with the mobile device). For example, when a mobile device (also referred to herein as user equipment) attempts to make a call or initiate a data session, the mobile device queries a basestation (such as an evolved node-B), which queries a mobility management entity to obtain authorization to grant the mobile device access to the mobile network and, if so, under what parameters. The mobility management entity, in turn, queries a network element, such as a home location register or a home subscriber server maintaining subscriber data for mobile devices operating in the network, to access the respective subscriber data associated with the mobile device. The mobility management entity uses this subscriber data to determine whether to allow the mobile device to access the mobile network and, if so, under what parameters. However, if the subscriber data is unavailable due to, for example, failure of the network element maintaining the subscriber data, the mobility management entity may be unable to make this determination, thereby preventing the mobile device from accessing the mobile network.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
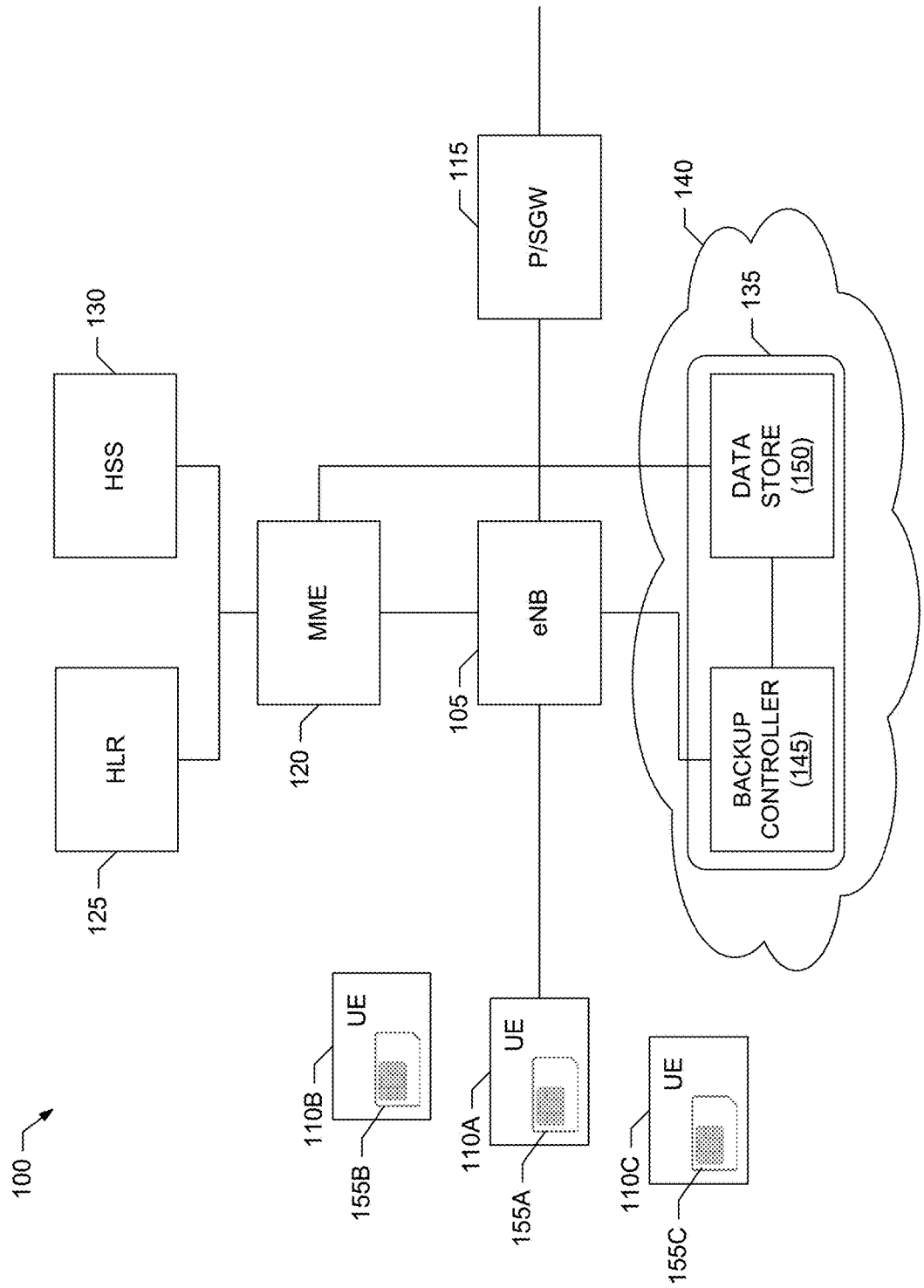
FIG. 1 is a block diagram of an example mobile network supporting recovery of subscriber data in accordance with the teachings of this disclosure.

Methods, apparatus, systems and articles of manufacture (e.g., physical storage media) to recover subscriber data in mobile communication networks are disclosed herein. Example subscriber data recovery methods disclosed herein, which may be performed by, for example, an example backup service implemented by a cloud service, include communicating with example mobile devices operating in an example mobile network to configure the mobile devices to (1) locally store backup subscriber data corresponding to subscriber data maintained at a first example network element to manage access to the mobile network and (2) transmit the backup subscriber data to a destination based on configuration data. Such disclosed example methods also include receiving respective backup subscriber data from respective ones of the mobile devices. Such disclosed example methods further include queueing the respective backup subscriber data received from the respective ones of the mobile devices for transmission to at least one of the first network element and/or a second example network element to restore the subscriber data maintained at a first network element.

In some such disclosed example methods, the first network element corresponds to at least one of a home location register and/or a home subscriber server. In some such disclosed example methods, the second network element corresponds to a mobility management entity. In some such disclosed example methods, the queueing of the respective backup subscriber data includes queueing the respective backup subscriber data for transmission to the mobility management entity.

Additionally or alternatively, in some disclosed example methods, the destination corresponds to the cloud service, and the methods further include communicating with the plurality of mobile devices to configure a destination address associated with the cloud service. In some such disclosed example methods, the queueing of the respective backup subscriber data includes storing the respective backup subscriber data received from the respective ones of the mobile devices at a cloud data store. In some such disclosed example methods, the queueing of the respective backup subscriber data also includes pushing the respective backup subscriber data stored at the cloud data store to at least one of the first network element and/or the second network element according to a queueing schedule.

Additionally or alternatively, in some such disclosed example methods, the configuration data specifies that the backup subscriber data is to be transmitted in response to receipt of a message from a third network element providing an air interface of the mobile network. In some such disclosed example methods, the third network element corresponds to an evolved Node-B.

Additionally or alternatively, in some such disclosed example methods, the configuration data specifies that the backup subscriber data is to be transmitted to the destination repeatedly as a background process.

Additionally or alternatively, in some such disclosed example methods, the respective backup subscriber data is to be locally stored in subscriber identity modules of the respective ones of the mobile devices.

Example subscriber data recovery methods disclosed herein, which may be performed by, for example, a mobile device operating in an example mobile network, include receiving, at the mobile device, configuration data to configure the mobile device to (1) locally store backup subscriber data corresponding to subscriber data maintained at an example network element to manage access to a mobile network and (2) transmit the backup subscriber data to a destination based on the configuration data. Such disclosed example methods also include storing the backup subscriber data. Such disclosed example methods further include transmitting the backup subscriber data to the destination based on the configuration data.

In some such disclosed example methods, the destination corresponds to a cloud service, and the configuration data specifies a destination address associated with the cloud service.

Additionally or alternatively, in some such disclosed example methods, the network element is a first network element, and the configuration data specifies that the backup subscriber data is to be transmitted in response to receipt of a message from a second network element providing an air interface of the mobile network. In some such disclosed example methods, the first network element corresponds to at least one of a home location register and/or a home subscriber server, and the second network element corresponds to an evolved Node-B.

Additionally or alternatively, in some such disclosed example methods, the configuration data specifies that the backup subscriber data is to be transmitted to the destination repeatedly as a background process.

Additionally or alternatively, in some such disclosed example methods, the backup subscriber data is to be locally stored in a subscriber identity module of the mobile device.

Example subscriber data recovery methods disclosed herein, which may be performed by, for example, a first network element, such as a mobility management entity, operating in an example mobile network, include, in response to detecting that a second example network element maintaining subscriber data to manage access to the mobile network is unavailable, sending a message to request that example mobile devices operating in the mobile network transmit, to an example backup service, respective backup subscriber data corresponding to the subscriber data maintained at the second network element. Such disclosed example methods also include receiving the respective backup subscriber data from the backup service. Such disclosed example methods further include forwarding the respective backup subscriber data to the second network element to restore the subscriber data maintained at the network element.

In some such disclosed example methods, the backup service corresponds to a cloud service. Additionally or alternatively, in some such disclosed example methods, the second network element correspond to at least one of a home location register and/or a home subscriber server.

Additionally or alternatively, some such disclosed example methods further include detecting the unavailability of the second network element after querying the second network element to determine whether to allow a first one of the mobile devices to access the mobile network.

Additionally or alternatively, some such disclosed example methods further include maintaining copies of the respective backup subscriber data received from the backup service. Some such disclosed example methods also include using the copies of the respective backup subscriber data to determine whether to allow a first one of the mobile devices access to access the mobile network while the subscriber data maintained at the second network element is being restored.

These and other example methods, apparatus, systems and articles of manufacture (e.g., physical storage media) to recover subscriber data in mobile communication networks are disclosed in greater detail below.

As mentioned above, mobile networks include network elements, such as home location registers (HLRs), home subscriber servers (HSSs), etc., that maintain subscriber data used by the network to determine whether to grant access to mobile devices (e.g., also referred to herein as user equipment or UEs) and, if so, under what conditions (e.g., parameters) access is to be granted. If an HLR or HSS fails due to, for example, a malware attack, a catastrophic event, etc., mobile devices may be prevented from accessing the mobile network. Prior mobile networks have relied on subscriber data backups stored on one or more backup servers to reconstruct the subscriber data maintained at the HLR or HSS after such a failure. However, because such prior backup techniques typically reside on just one or a few centralized servers, the subscriber data for many network subscribers (e.g., millions of subscribers) may be irretrievably lost due to failure of just a relatively few points in the network, namely, the HLR and/or HSS, and the one (or few) centralized servers storing the backup data.

Example methods, apparatus, systems and articles of manufacture (e.g., physical storage media) provide technical solutions to the foregoing technical problems associated with backing up and recovering subscriber data in mobile communication networks. As disclosed in further detail below, example technical solutions disclosed herein recover subscriber data lost at a first network element (e.g., an HLR or HSS) by restoring the subscriber data from backup subscriber data maintained remotely at the mobile devices operating in the network. By maintaining the backup subscriber data remotely at the different mobile devices operating in the network, the risk of irretrievable loss of subscriber data is reduced as the backup subscriber data is distributed throughout the network, rather than being maintained at just one, or a few, locations in the network.

Some such disclosed example technical solutions utilize an example backup service (e.g., implemented by cloud service) to configure mobile devices operating in the mobile network to act as benign bots capable of storing backup subscriber data at the mobile devices (e.g., on subscriber identity modules, or SIMs, of the mobile devices), and transmitting the backup subscriber data to the cloud service (and/or a specified storage location) when failure of the first network element (e.g., the HLR or HSS) is detected. In some disclosed example technical solutions, the backup service configures the mobile devices to additionally or alternatively report their respective backup subscriber data repeatedly as a background process to permit the backup service to continually update its stored subscriber data, rather than waiting until failure of the first network element (e.g., the HLR or HSS) occurs.

In some disclosed example technical solutions, the backup service aggregates the backup subscriber data reported by the UEs, and sends it to a second network element, such as a mobility management entity, or MME) after failure of the first network element (e.g., the HLR or HSS) is detected. The second network element (e.g., the MME), in turn, relays the received backup subscriber data to the first network element (e.g., the HLR or HSS) to permit the subscriber data maintained at the first network element to be restored, thereby enabling the first network element to recover after the failure. In some examples, if the backup service aggregates the backup subscriber data continually (e.g., as a background process), the backup subscriber data for some or all of the mobile devices in the network can be provided the second network element (e.g., the MME) in bulk and used to restore the first network element (e.g., the HLR or HSS) quickly after a failure. In some examples, if the backup service instead configures the mobile devices to report their respective backup subscriber data when the failure of the first network element (e.g., the HLR or HSS) is detected, the backup subscriber data for respective ones of the mobile devices is provided to the second network element (e.g., the MME) as it is received, and the subscriber data maintained at the at the first network element (e.g., the HLR or HSS) is restored in a piecemeal fashion as the mobile devices report their respective backup subscriber data. As disclosed in further detail below, in some examples, the second network element (e.g., the MME) retains copies of the backup subscriber data provided by the backup service to permit the second network element to process mobile device connection requests using the backup subscriber data while the first network element (e.g., the HLR or HSS) is being restored.

Turning to the figures, a block diagram of an example mobile network 100 supporting recovery of subscriber data in accordance with the teachings of this disclosure is illustrated in FIG. 1. The mobile network 100 of the illustrated example implements a mobile network compliant with the third generation partnership project (3GPP) standards. Accordingly, the example mobile network 100 includes one or more evolved node-Bs, such as an example evolved node-B (eNB) 105, conforming to the 3GPP standards. In the illustrated example, the eNB 105 implements an air interface to provide example mobile devices 110A-C operating in the mobile network 100 with access to a core network via one or more example serving (S) and/or packet data network (P) gateways (GWs) conforming to the 3GPP standards, represented as an example P/SGW 115 in FIG. 1. The example mobile devices 110A-C can be implemented by any type(s) and/or number(s) of mobile devices, user equipment (UE), computing devices, etc.

The example mobile network 100 of FIG. 1 also includes one or more MMEs, such as an example MME 120, conforming to the 3GPP standards. In the illustrated example, the MME 120, among other things, authenticates the example mobile devices 110A-C or, in other words, determines whether to allow the mobile devices 110A-C to access the mobile network 100. In the example mobile network 100, the MME 120 queries one or more network elements maintaining subscriber data for respective ones of the mobile devices 110A-C, such as an example HLR 125 and/or an example HSS 130 conforming to the 3GPP standards, to access and evaluate the subscriber data to determine whether to grant the mobile devices 110A-C access to the mobile network 100. In the illustrated example of FIG. 1, the example HLR 125 maintains subscriber data to support third generation (3G) compliant network access, whereas the example HSS 130 maintains subscriber data to support fourth generation (4G) compliant network access. Accordingly, the mobile network 100 may include either or both of the example HLR 125 and/or the example HSS 130 (or multiple instances of either or both of the example HLR 125 and/or the example HSS 130).

If the example HLR 125 and/or the example HSS 130 fails due to, for example, a malware attack, a catastrophic event, etc., the example MME 120 is unable to access the subscriber maintained by the failed HLR 125 and/or HSS 130. To support recovery of the subscriber data maintained by the failed HLR 125 and/or HSS 130 (and/or one or more other network elements), the example mobile network 100 includes an example backup service 135 implemented in accordance with the teachings of this disclosure. In the illustrated example of FIG. 1, the backup service 135 is implemented as a cloud service in an example network cloud 140, and includes an example cloud backup controller 145 and an example cloud data store 150.

As disclosed in further detail below, the example cloud backup controller 145 communicates with the example mobile devices 110A-C to configure the mobile devices 110A-C to locally store backup subscriber data, which corresponds to the subscriber data maintained at the HLR 125 and/or HSS 130, at the mobile devices 110A-C. For example, the cloud backup controller 145 may configure the mobile devices 110A-C to store their respective backup subscriber data locally in example SIMs 155A-C of the mobile devices 110A-C. The example cloud backup controller 145 also communicates with the example mobile devices 110A-C to configure the mobile devices 110A-C to transmit their locally stored backup data to a destination based on provided configuration data. For example, the configuration data may specify a destination address of the backup service 135 (e.g., corresponding to the cloud backup controller 145) as the destination to which the mobile devices 110A-C are to transmit their respective, locally stored backup data. Additionally or alternatively, the configuration data may specify one or more conditions that are to cause (e.g., trigger) the mobile devices 110A-C to transmit their respective, locally stored backup data. For example, the configuration data may specify that the mobile devices 110A-C are to transmit their respective, locally stored backup data in response to receipt of a message from the eNB 105, and/or repeatedly as a background process, etc.

In the illustrated example of FIG. 1, the cloud backup controller 145 of the example backup service 135 is responsible for receiving the respective backup data from the different mobile devices 110A-C (e.g., when the condition(s) specified by the configuration data are met). The example cloud backup controller 145 further transmits or otherwise provides the received backup data to the example data store 150. The example data store 150, in turn, is responsible for queueing the respective backup subscriber data received from the different mobile devices 110A-C for transmission to an appropriate network element to permit subscriber data recovery. For example, the data store 150 may queue the received backup subscriber data for transmission to a first network element (e.g., such as the HLR 125 and/or the HSS 130) recovering from a failure, or to a second network element (e.g., such as the MME 120), which is to forward the backup subscriber data to the first network element recovering from the failure.

For example, in the mobile network 100, the example MME 120 is adapted to interact with the example backup service 135 to receive backup subscriber data aggregated by the backup service 135 and to forward the backup subscriber data to an appropriate network element, such as the HLR 125 and/or the HSS 130, to restore the subscriber data maintained by that network element, thereby permitting the network element to recover after a failure. In such examples, the data store 150 aggregates and queues the backup subscriber data received from the mobile devices 110A-C and pushes or otherwise transmits the queued backup subscriber data to the MME 120 according to a queueing schedule. In this way, the backup service 135 can manage the amount of data bandwidth consumed to transmit backup subscriber data to the MME 120.

In some examples, the MME 120 also maintains copies of the backup subscriber data received from the example backup service 135. As disclosed in further detail below, the MME 120 can use the copies of the backup subscriber data to process connection request(s) associated with one or more of the mobile devices 110A-C while the subscriber data maintained by the HLR 125 and/or the HSS 130 is still being recovered. This allows the MME 120 to, for example, determine whether to allow the mobile devices 110A-C to access the mobile network 100 while the HLR 125 and/or the HSS 130 is unavailable (e.g., during a failure, while recovering from a failure, etc.).

As disclosed in further detail below, in some examples, to configure the mobile devices 110A-C, the backup service 135 downloads software (e.g., an app) or otherwise configures functionality in the mobile devices 110A-C to cause the mobile devices 110A-C to act as benign bots in a botnet managed by the example backup controller 145. By behaving as benign bots, the mobile devices 110A-C can be configured to locally store and transmit backup data unobtrusively (e.g., without interaction with users of the mobile devices 110A-C).

Figure 2:
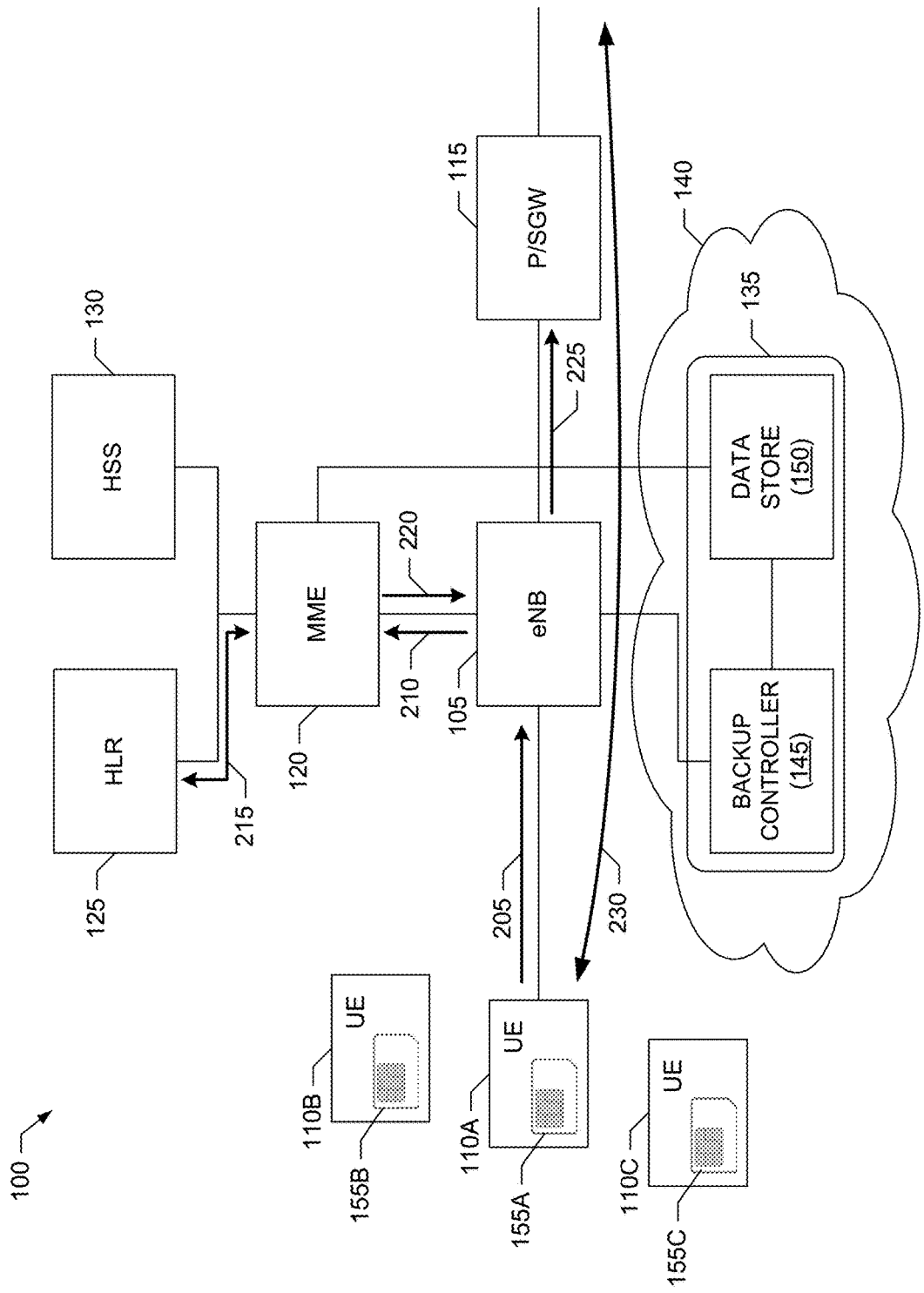
FIG. 2 illustrates example messaging exchanged in the example mobile network of FIG. 1 during normal operation.

FIG. 2 illustrates example messaging exchanged in the example mobile network 100 of FIG. 1 during normal operation when subscriber data recovery is not being performed. The example messaging of FIG. 2 begins with the example mobile device 110A initiating a connection request via example messaging 205 with the example eNB 105 to gain access to the example mobile network 100. For example, the messaging 205 may correspond to an attempt to make a voice call and/or initiate a data session. Responsive to this connection request, the example eNB 105 queries the example MME 120 via example messaging 210 to receive authorization to permit the mobile device 110A to access the mobile network 100 and, if so, under what parameters. In the illustrated example, responsive to this query, the MME 120 queries, via example messaging 215, the example HLR 125 to access the subscriber data maintained by the HLR 125 for the mobile devices operating in the mobile network 100. (In other examples, the MME 120 may query the HSS 130 to access the subscriber data maintained by the HSS 130 for the mobile devices operating in the mobile network 100.)

In the illustrated example of FIG. 2, the MME 120 accesses the subscriber data maintained by the HLR 125 for the mobile device 110A and determines that the mobile device 110A is authorized to access the mobile network 100. Additionally, the MME 120 uses the subscriber data maintained by the HLR 125 for the mobile device 110A to determine the parameters under which the mobile device 110A is able to access the mobile network 100. For example, the subscriber data for the mobile device 110A may specify parameters such as services, data rates, billing rates, etc., associated the mobile device 110A.

In the illustrated example of FIG. 2, the MME 120 responds to the eNB 105 via example messaging 220 to inform the eNB 105 that the mobile device 110A is authorized to access the mobile network 100 and the parameters governing this access. The eNB 105, in turn, uses this information to establish, via example messaging 225, a communication path for the mobile device with the core network via the example P/SGW 115. Once this communication path is established, the mobile device 110A is able to exchange example traffic 230 (e.g., voice and/or data traffic) with the core network.

Figure 3:
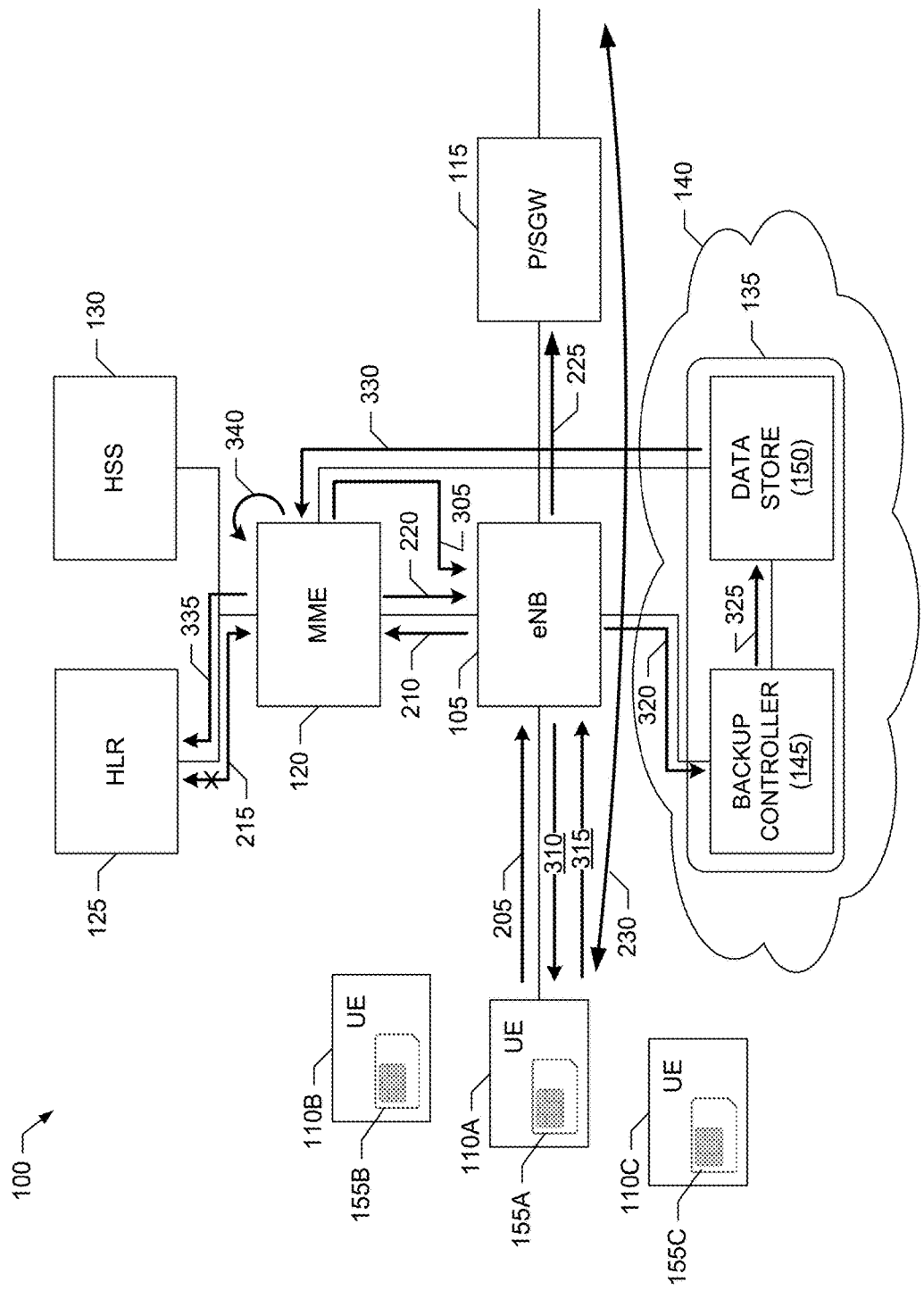
FIG. 3 illustrates example messaging exchanged in the example mobile network of FIG. 1 to recover subscriber data in accordance with the teachings of this disclosure.

FIG. 3 illustrates example messaging exchanged in the example mobile network 100 of FIG. 1 when subscriber data recovery is being performed in accordance with the teachings of this disclosure. In the illustrated example of FIG. 3, the example backup controller 145 of the example backup service 135 has downloaded and configured backup bot functionality on the example mobile device 110A, or configured backup bot functionality already implemented by the example mobile device 110A. For example, such configuration may include, but is not limited to, the backup controller 145 communicating configuration data to the mobile device 110A to configure (e.g., enable) the mobile device to locally store its respective backup subscriber data on the SIM 155A of the mobile device 110A, and to transmit the backup subscriber data to a destination (e.g., specified in the configuration data) of the backup service 135.

Similar to the example of FIG. 2, the example messaging of FIG. 3 begins with the example mobile device 110A initiating a connection request via the example messaging 205 with the example eNB 105 to gain access to the example mobile network 100. For example, the messaging 205 may correspond to an attempt to make a voice call and/or initiate a data session. Responsive to this connection request, the example eNB 105 queries the example MME 120 via the example messaging 210 to receiving authorization to permit the mobile device 110A to access the mobile network 100 and, if so, under what parameters. In the illustrated example, responsive to this query, the MME 120 queries, via the example messaging 215, the example HLR 125 to access the subscriber data maintained by the HLR 125 for the mobile devices operating in the mobile network 100. (In other examples, the MME 120 may query the HSS 130 to access the subscriber data maintained by the HSS 130 for the mobile devices operating in the mobile network 100.)

However, unlike the example of FIG. 2, in the example of FIG. 3, the MME 120 detects that the HLR 125 is unavailable in response to the query associated with the example messaging 215. For example, the MME 120 may detect that the HLR 125 is unavailable when the query from the MME 120 times out, when an error message is received from the HLR 125 in response to the query, etc. In the illustrated example of FIG. 3, in response to detecting the HLR 125 is unavailable, the MME 120 requests, via example messaging 305, the eNB 105 to command the mobile devices in its vicinity, including the example mobile device 110A, to transmit their respective, locally stored backup subscriber data to the backup service 135 (e.g., according to the respective configuration data provided to the mobile devices). Responsive to this request, the eNB 105 commands, via example messaging 310, the mobile devices in its vicinity, including the example mobile device 110A, to transmit their respective, locally stored backup subscriber data to the backup service 135. The example messaging 310 may be implemented by broadcast signaling (e.g., targeted for mobile devices operating in idle mode) and/or dedicated signaling (e.g., targeted for mobile devices already connected to and communicating with the eNB 105).

Responsive to the example messaging 310, the mobile device 110A transmits its respective backup subscriber data, which is stored on the device's SIM 155A, to the backup service 135 (e.g., to a destination address of the backup service 135 configured via the configuration data provided by the backup controller 145). In the illustrated example of FIG. 3, the mobile device 110A transmits its respective backup subscriber data via example messaging 315 over the air interface provided by the eNB 105, which forwards the backup subscriber data to the backup service 135 via example messaging 320. In the illustrated example of FIG. 3, the backup controller 145 of the backup service 135 receives the backup subscriber data from the mobile device 110A (and any other mobile devices reporting their respective backup subscriber data), and transmits (e.g., via example message 325) or otherwise provides the received backup subscriber data to the example data store 150 of the backup service 135.

In the illustrated example of FIG. 3, the data store 150 aggregates and queues backup subscriber data received from mobile devices, including the mobile device 110A, for transmission to one or more network elements, including the MME 120. In the illustrated example of FIG. 3, the network elements, such as the MME 120, subscribe to the backup service 135 to receive backup subscriber data (e.g., as aggregated batch data, piecemeal as new backup subscriber data becomes available, etc.). The data store 150 queues the backup subscriber data according to a queueing schedule to control when the backup subscriber data is transmitted, thereby controlling the amount of network bandwidth consumed to transmit backup subscriber data to the subscribing network elements, such as the MME 120.

In the illustrated example of FIG. 3, the data store 150 pushes the respective backup subscriber data received from mobile devices, including the mobile device 110A, to the MME 120 via example messaging 330. The MME 120 then forwards, via example messaging 335, the backup subscriber data received from the backup service 135 to the HLR 125 to recover the subscriber data maintained by the HLR 125 and, thus, restore operation of the HLR 125. In the illustrated example of FIG. 3, the MME 120 also retains (represented by a directed line 340 in FIG. 3) copies of the backup subscriber data received from the backup service 135. While the HLR 125 is being restored, the example MME 120 can use the retained copy of the backup subscriber data for the mobile device 110A to determine whether the mobile device 110A is authorized to access the mobile network 100 and, if so, under what parameters.

In the illustrated example of FIG. 3, the MME 120 determines from its retained backup subscriber data that the mobile device 110A is authorized to access the mobile network 100. Additionally, the MME 120 uses the retained backup subscriber data to determine the parameters (services, data rates, billing rates, etc.) under which the mobile device 110A is able to access the mobile network 100. Similar to the example of FIG. 2, in the example of FIG. 3, the MME 120 then responds to the eNB via the example messaging 220 to inform the eNB 105 that the mobile device 110A is authorized to access the mobile network 100 and the parameters governing this access. The eNB 105, in turn, uses this information to establish, via the example messaging 225, a communication path for the mobile device with the core network via the example P/SGW 115. Once this communication path is established, the mobile device 110A is able to exchange the example traffic 230 (e.g., voice and/or data traffic) with the core network.

Figure 4:
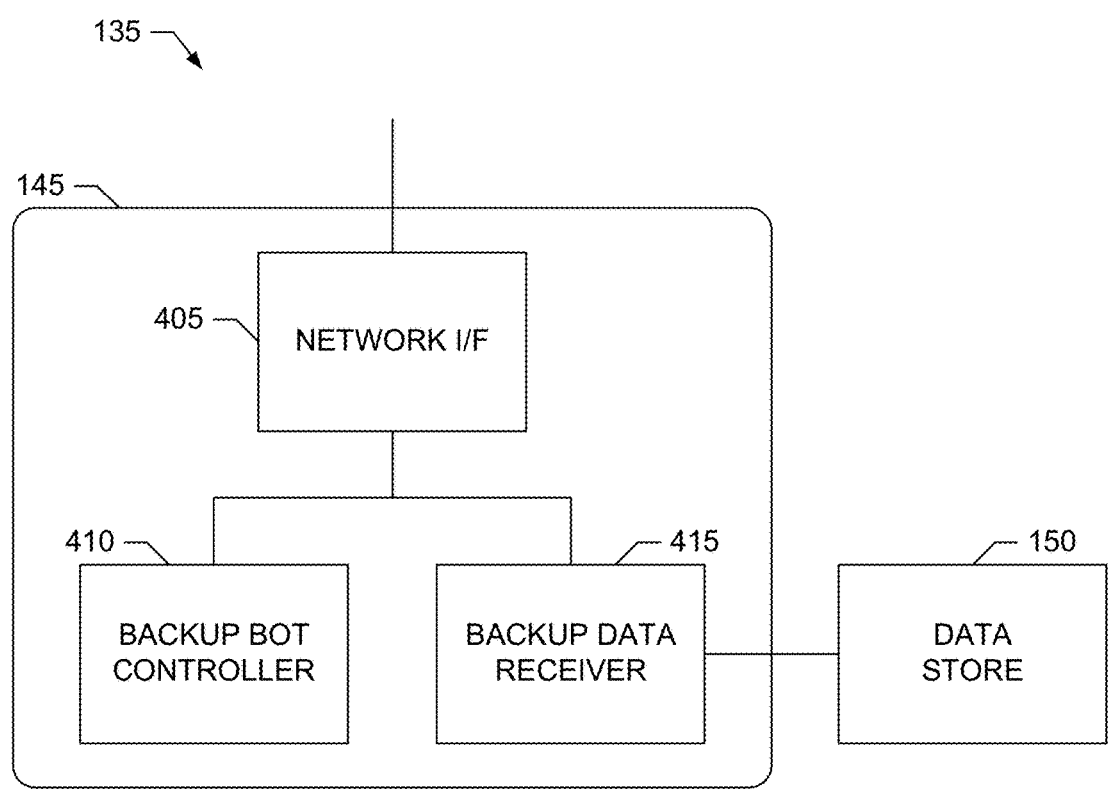
FIG. 4 is a block diagram of an example backup service included in the example mobile network of FIG. 1 to recover subscriber data in accordance with the teachings of this disclosure.

A block diagram illustrating an example implementation of the example backup service 135 of FIGS. 1-3 is illustrated in FIG. 4. The example backup service 135 of FIG. 4 includes the example backup controller 145 and the example data store 150. In the illustrated example of FIG. 4, the backup controller 145 includes an example network interface 405 to connect to one or more communication networks, links, etc., in communication with the eNB 105 and/or one or more other network elements from which backup subscriber data can be received from mobile devices, such as the mobile devices 110A-C. The example network interface 405 can be implemented by any type(s), number(s) and/or combination(s) of interfaces, such as the example interface circuit 1020 of FIG. 10, which is described in further detail below.

The example backup controller 145 of FIG. 4 also includes an example backup bot controller 410 to control backup bot functionality implemented by mobile devices, such as the mobile devices 110A-C, operating in the example mobile network 100. In some examples, the backup bot controller 410 downloads, or causes to be downloaded, backup bot application software to one or more of the mobile devices 110A-C to provide backup bot functionality to the respective mobile device(s) 110A-C. Additionally or alternatively, in some examples, the backup bot controller 410 controls backup bot functionality already resident on one or more of the mobile devices 110A-C, which have been adapted/implemented to support subscriber data recover in accordance with the teachings of this disclosure.

The example backup bot controller 410 of FIG. 4 also communicates with the backup bot functionality of the mobile devices 110A-C to configure the mobile devices 110A-C to locally store respective backup subscriber data corresponding to the subscriber data maintained at one or more network elements for managing access to the mobile network 100. As disclosed in further detail below, the backup subscriber data can include persistent subscriber data and/or temporary subscriber data. In some examples, the backup bot controller 410 specifies the type(s) of subscriber data (e.g., persistent and/or temporary) to be locally stored, and/or which element(s) of the different type(s) of subscriber data is(are) to be locally stored.

The example backup bot controller 410 of FIG. 4 also communicates with the backup bot functionality of the mobile devices 110A-C to configure the mobile devices 110A-C to transmit their respective locally stored backup subscriber data based on provided configuration data. For example, the configuration data provided by the backup bot controller 410 may specify a destination address of the backup service 135 to which respective ones of the mobile devices 110A-C are to transmit their respective backup subscriber data. For example, this destination address may correspond to a network address associated with the backup bot controller 410, a network address associated with the data store 150, another network address associated with the backup service 135, etc. Additionally or alternatively, the configuration data provided by the backup bot controller 410 may specify one or more conditions under which the respective ones of the mobile devices 110A-C are to transmit their respective backup subscriber data to the destination. For example, the configuration data may specify that the mobile devices 110A-C are to transmit their respective backup subscriber data in response to receipt of a message from an eNB (e.g., such as the eNB 105), repeatedly as a background process (e.g., according to a specified reporting schedule, such as daily, hourly, at one or more specified time(s)-of-day, etc.), etc., or any combination thereof.

The example backup controller 145 of FIG. 4 further includes an example backup data receiver 415 to receive, via the network interface 405, respective backup subscriber data reported by respective ones of the mobile devices 110A-C (e.g., for which backup bot functionality has been configured). The backup data receiver 415 also transmits or otherwise forwards the respective backup subscriber data received from the respective ones of the mobile devices 110A-C to the data store 150. The data store 150 aggregates the backup subscriber data received from the respective mobile devices 110A-C and queues the stored backup subscriber data for transmission to one or more network elements that have subscribed to, or have otherwise been configured to, receive backup subscriber data from the subscriber service 135.

In some examples, if the backup service 135 has configured the mobile devices 110A-C to report their backup subscriber data repeatedly (e.g., as background processes), the data store 150 aggregates the backup subscriber data continually (e.g., as a background process), and reports the stored backup subscriber data for some or all of the mobile devices 110A-C in the network to a target network element (e.g., the MME 120) in bulk. Such a technique can ensure that the target network element (e.g., the MME 120) has up-to-date backup subscriber data, and can be used to recover the subscriber data maintained by the target network element and/or another network element (e.g., the HLR 125 and/or the HSS 130) quickly after a failure. In some examples, if the backup service 135 has configured the mobile devices 110A-C to report their backup subscriber data upon a given event (e.g., such as when a message from the eNB is received, or failure of a network element, such as the HLR 125 and/or the HSS 130, is detected, etc.), the data store 150 queues the respective backup subscriber data for transmission to the target network element (e.g., the MME 120) as it is received from the mobile devices 110A-C. Such a technique permits the subscriber data maintained at the target network element and/or another network element (e.g., the HLR 125 and/or the HSS 130) to be restored in a piecemeal fashion as the mobile devices 110A-C reports their respective backup subscriber data.

Figure 5:
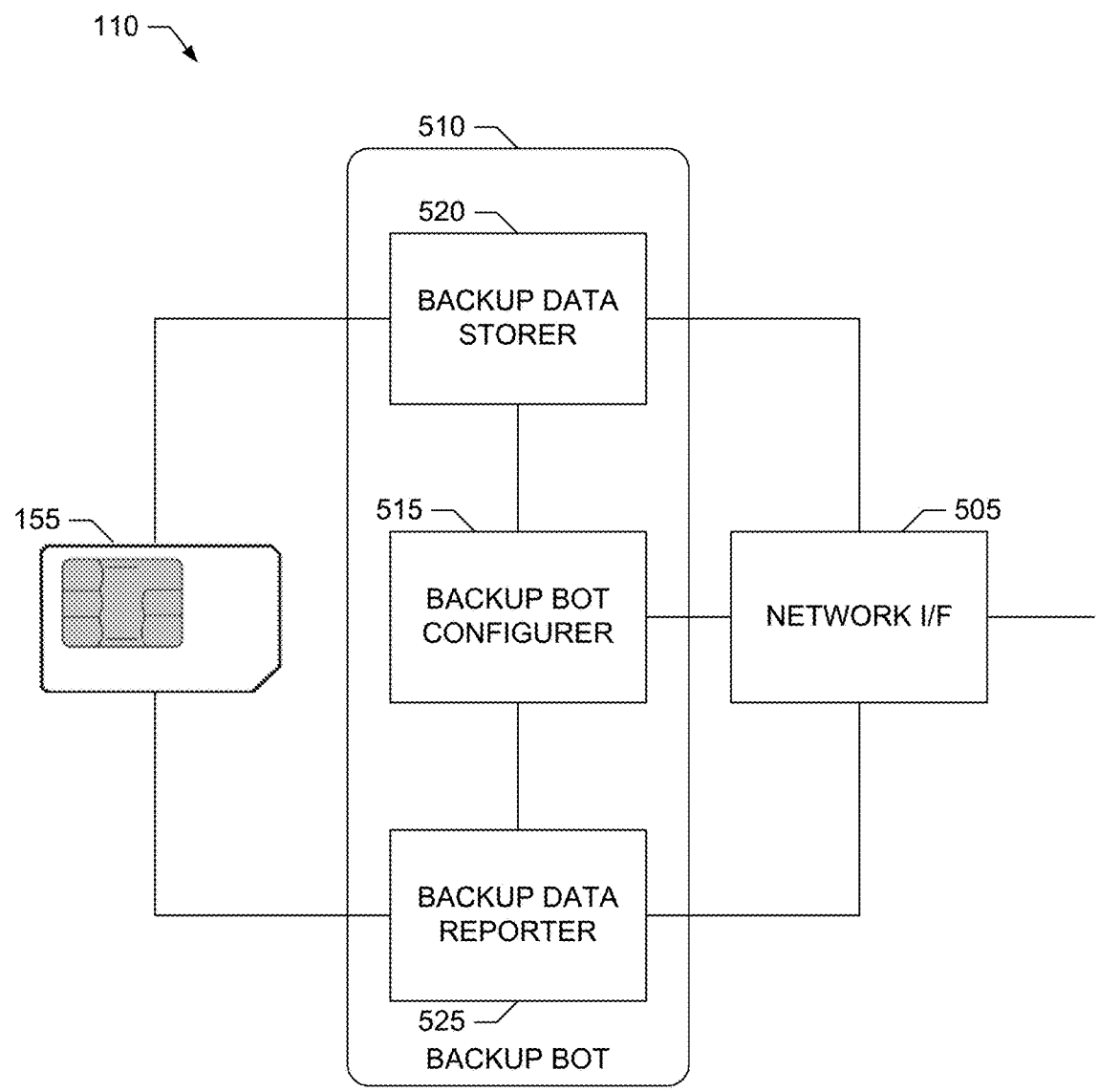
FIG. 5 is a block diagram of an example mobile device operating in the example mobile network of FIG. 1 and adapted to support recovery of subscriber data in accordance with the teachings of this disclosure.

A block diagram of an example mobile device 110 that may be used to implement one or more of the example mobile devices 110A-C of FIGS. 1-3 is illustrated in FIG. 5. The example mobile device 110 of FIG. 5 includes an example network interface 505 capable of interfacing with an air interface provided by one or more network elements, such as the eNB 105, of the mobile network. The example network interface 505 can be implemented by any type(s), number(s) and/or combination(s) of interfaces, such as the example interface circuit 1120 of FIG. 11, which is described in further detail below.

The example mobile device 110 of FIG. 5 also includes an example backup bot 510 to locally store and report backup subscriber data associated with the mobile device 110 (e.g., associated with a subscriber operating the mobile device 110) in accordance with the teachings of this disclosure. In some examples, the backup bot 510 is implemented by backup bot application software downloaded to the mobile device 110. In some examples, the backup bot 510 is implemented by hardware, software, firmware, etc., or any combination thereof, which is integrated in the mobile device 110.

The example backup bot 510 of FIG. 5 includes an example backup bot configurer 515 to receive configuration data via the network interface 505 from one or more backup services, such as the example backup service 135, to configure behavior of the backup bot 510. In the illustrated example of FIG. 5, the backup bot configurer 515 uses the configuration data received from the backup service 135 to configure operation of an example backup data storer 520 and an example backup data reporter 525 included in the backup bot 510. For example, the backup bot configurer 515 uses the configuration data received from the backup service 135 to configure the backup data storer 520 to store backup subscriber data associated with the mobile device 110 locally in, for example, an example SIM 155 of the mobile device 110. In some examples, the configuration data received from the backup service 135 includes or otherwise specifies the backup subscriber data to be stored by the backup data storer 520 in the SIM 155.

As noted above, backup subscriber data can include persistent subscriber data and/or temporary subscriber data. Persistent subscriber data includes subscriber data associated with a subscriber's subscription governing access of the mobile device 110 to the mobile network 100. As such, persistent subscriber data typically changes infrequently, such as when a subscriber changes aspects of her subscription (e.g., to add/remove services, change service characteristics, etc.). Example of persistent subscriber data include, but are not limited to, a user identifier (ID) and/or telephone number, user authentication parameters, an allowed default quality of service (QoS), allowed services for the mobile device 110, allowed data connections for the mobile device 110, allowed maximum data rate for the mobile device 110, radio access restrictions, billing and/or other authentication keys, etc.

In contrast, temporary subscriber data includes subscriber data associated with operation of the mobile device 110 and, thus, may change frequently, or more frequently than persistent subscriber data. Examples of temporary subscriber data include, but are not limited to, current location information, identification information for a current serving MME (e.g., the MME 120) and/or a serving general packet radio service (GPRS) support node (SGSN), current authentication vectors, etc.

In some examples, the configuration data received from the backup service 135 specifies whether persistent backup subscriber data and/or temporary backup subscriber data is to be stored locally in the SIM 155 by the backup data storer 520. In some examples, the configuration data received from the backup service 135 includes one or more elements of persistent backup subscriber data to be stored locally in the SIM 155 by the backup data storer 520, and/or specifies the network location(s) from which such persistent backup subscriber data can be retrieved by the backup data storer 520 for storage in the SIM 155. In some examples, the configuration data received from the backup service 135 specifies which one or more elements of temporary backup subscriber data is/are to be stored locally in the SIM 155 by the backup data storer 520. In some example, the configuration data specifies the network location(s) from which such temporary backup subscriber data can be retrieved by the backup data storer 520 for storage in the SIM 155. In some examples, one or more network elements, such as the MME 120, with knowledge of the temporary backup subscriber data provide the temporary backup subscriber data to the mobile device 110 for storage by the backup data storer 520 in the SIM 155.

In the illustrated example of FIG. 5, the backup bot configurer 515 additionally or alternatively uses the configuration data received from the backup service 135 to configure the backup data reporter 525 to transmit, via the network interface 505, the backup subscriber data stored locally in the SIM 155 to a destination based on the configuration data. For example, the configuration data may specify a destination address of the backup service 135 to which the backup data reporter 525 is to transmit the backup subscriber data stored locally in the SIM 155. Additionally or alternatively, the configuration data may specify one or more conditions under which the mobile device 110 is to transmit the backup subscriber data stored locally in the SIM 155. For example, the configuration data may specify that the mobile device 110 is to transmit the backup subscriber data in response to receipt of a message from an eNB (e.g., such as the eNB 105), repeatedly as a background process (e.g., according to a specified reporting schedule, such as daily, hourly, at one or more specified time(s)-of-day, etc.), etc., or a combination thereof.

In the illustrated example of FIG. 5, the backup subscriber data for the mobile device 110 is locally stored on the SIM 155. Because a mobile device's SIM is controlled by the mobile network 100 and access to the data on the SIM is restricted, the data on the SIM is trustworthy relative to other data stored at the mobile device 110. By storing backup subscriber data, which is to be used for reconstructing network elements such as the HLR 125 and/or the HSS 130, on the SIM 155 of the mobile device 110, and keeping the stored data up-to-date with updates provided by the mobile network 100 (e.g., via the backup service 135 and/or the MME 120), the mobile device's SIM 155 becomes a reliable source of subscriber data for reconstructing network elements such as the HLR 125 and/or the HSS 130 after failures.

Figure 6:
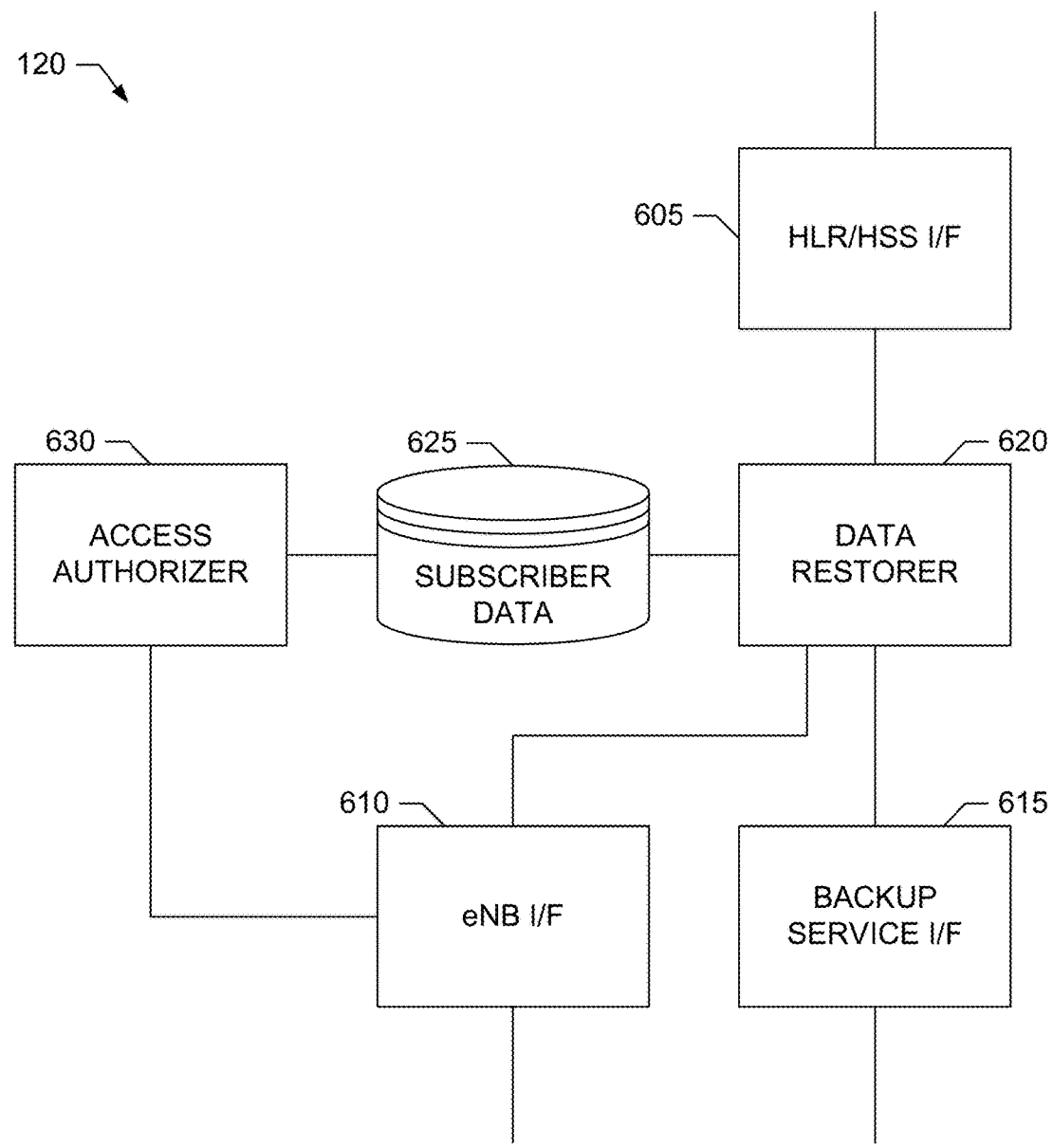
FIG. 6 is a block diagram of an example network element of the example mobile network of FIG. 1 that is adapted to support recovery of subscriber data in accordance with the teachings of this disclosure.

A block diagram illustrating an example implementation of the MME 120 of FIGS. 1-3 is illustrated in FIG. 6. The example MME 120 of FIG. 6 includes an example HLR/HSS interface 605 to connect to one or more communication networks, links, etc., in communication with the HLR 125, the HSS 130 and/or one or more other network elements maintaining subscriber data in the mobile network 100. The example MME 120 of FIG. 6 also includes an example eNB interface 610 to connect to one or more communication networks, links, etc., in communication with the eNB 105 and/or one or more other network elements implementing the air interface of the mobile network 100. The example MME 120 of FIG. 6 further includes an example backup service interface 615 to connect to one or more communication networks, links, etc., in communication with the backup service 135 (e.g., via the example network cloud 140). The example interfaces 605, 610 and/or 615 can be implemented by any type(s), number(s) and/or combination(s) of interfaces, such as one or more of the example interface circuits 1220 of FIG. 12, which is described in further detail below The example MME 120 of FIG. 6 also includes an example data restorer 620 to restore subscriber data maintained by one or more network elements (such as the HLR 125 and/or the HSS 130) of the mobile network 100 in accordance with the teachings of this disclosure. In the illustrated example of FIG. 6, the data restorer 620 subscribes to or is otherwise configured to receive backup subscriber data from one or more backup services, such as the example backup service 135. The example data restorer 620 also detects whether one or more network elements (such as the HLR 125 and/or the HSS 130) maintaining subscriber data are unavailable. For example, the data restorer 620 may detect that the HLR 125 (or the HSS 130) is unavailable in response to querying, via the interface 605, the HLR 125 (or the HSS 130) to access subscriber data maintained by that network element. In some examples, if the query times out before a response is received, or the response includes an error message, etc., the data restorer 620 determines that the queried network element (e.g., the HLR 125, the HSS 130, etc.) is unavailable.

In the illustrated example of FIG. 6, in response to determining the queried network element (e.g., the HLR 125, the HSS 130, etc.) is unavailable, the data restorer 620 requests, via the interface 610, a network element such as the eNB 105 to command mobile devices in its vicinity, such as the mobile devices 110A-C, to transmit their respective, locally stored backup subscriber data to the backup service 135 (and/or another backup service). The example data restorer 620 receives this backup subscriber data from the backup service 135 via the interface 615. As disclosed above, the backup service 135 may push the backup subscriber data to the data restorer 620 as batch data, in piecemeal as the backup subscriber data is reported from respective ones of the mobile devices 110A-C, etc. The example data restorer 620 then stores the received backup subscriber data in an example subscriber data storage 625. The example subscriber data storage 625 may be implemented by any number(s) and/or type(s) of volatile and/or non-volatile memory, storage, etc., or combination(s) thereof, such as the example volatile memory 1214 and/or the example mass storage device(s) 1228 included in the example of FIG. 12.

In the illustrated example of FIG. 6, the data restorer 620 forwards the received backup subscriber data via the interface 605 to the affected network element (e.g., the HLR 125, the HSS 130, etc.) to restore the subscriber data maintained by that network element, thereby permit failure recovery of that network element. Additionally, the example MME 120 of FIG. 6 includes an example access authorizer 630 to authenticate mobile devices while the backup subscriber data is being used to restore the affected network element (e.g., the HLR 125, the HSS 130, etc.). For example, in response to a connection request from a mobile device, such as the mobile device 110A, the access authorizer 630 can use backup subscriber data for the mobile device 110A stored in the subscriber data storage 625 to determine whether the mobile device 110A is authorized to access the mobile network 100 and, if so, under what parameters.

Although subscriber data recovery, as disclosed herein, is described in the context of the example mobile network 100, which conforms to the 3GPP standards, subscriber data recovery in accordance with the teachings of this disclosure is not limited thereto. On the contrary, subscriber data recovery, as disclosed herein, can be adapted for use in any system, environment, etc., in which remote devices are able to store respective backup subscriber data and report it to a backup service.

While example manners of implementing the mobile network 100 are illustrated in FIGS. 1-6, one or more of the elements, processes and/or devices illustrated in FIGS. 1-6 may be combined, divided, re-arranged, omitted, eliminated and/or implemented in any other way. Further, the example eNB 105, the example mobile devices 110 and/or 110A-C, the example P/SGW 115, the example MME 120, the example HLR 125, the example HSS 130, the example backup service 135, the example network cloud 140, the example backup controller 145, the example data store 150, the example SIMs 155 and/or 155A-C, the network interface 405, the example backup bot controller 410, the example backup data receiver 415, the example network interface 505, the example backup bot 510, the example backup bot configurer 515, the example backup data storer 520, the example backup data reporter 525, the example HLR/HSS interface 605, the example eNB interface 610, the example backup service interface 615, the example data restorer 620, the example subscriber data storage 625, the example access authorizer 630 and/or, more generally, the example mobile network 100 of FIG. 1-6 may be implemented by hardware, software, firmware and/or any combination of hardware, software and/or firmware. Thus, for example, any of the example eNB 105, the example mobile devices 110 and/or 110A-C, the example P/SGW 115, the example MME 120, the example HLR 125, the example HSS 130, the example backup service 135, the example network cloud 140, the example backup controller 145, the example data store 150, the example SIMs 155 and/or 155A-C, the network interface 405, the example backup bot controller 410, the example backup data receiver 415, the example network interface 505, the example backup bot 510, the example backup bot configurer 515, the example backup data storer 520, the example backup data reporter 525, the example HLR/HSS interface 605, the example eNB interface 610, the example backup service interface 615, the example data restorer 620, the example subscriber data storage 625, the example access authorizer 630 and/or, more generally, the example mobile network 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mobile network 100, the example eNB 105, the example mobile devices 110 and/or 110A-C, the example P/SGW 115, the example MME 120, the example HLR 125, the example HSS 130, the example backup service 135, the example network cloud 140, the example backup controller 145, the example data store 150, the example SIMs 155 and/or 155A-C, the network interface 405, the example backup bot controller 410, the example backup data receiver 415, the example network interface 505, the example backup bot 510, the example backup bot configurer 515, the example backup data storer 520, the example backup data reporter 525, the example HLR/HSS interface 605, the example eNB interface 610, the example backup service interface 615, the example data restorer 620, the example subscriber data storage 625 and/or the example access authorizer 630 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile network 100 may include one or more elements, processes and/or devices in addition to, or instead of, those illustrated in FIGS. 1-6, and/or may include more than one of any or all of the illustrated elements, processes and devices.

Figure 7:
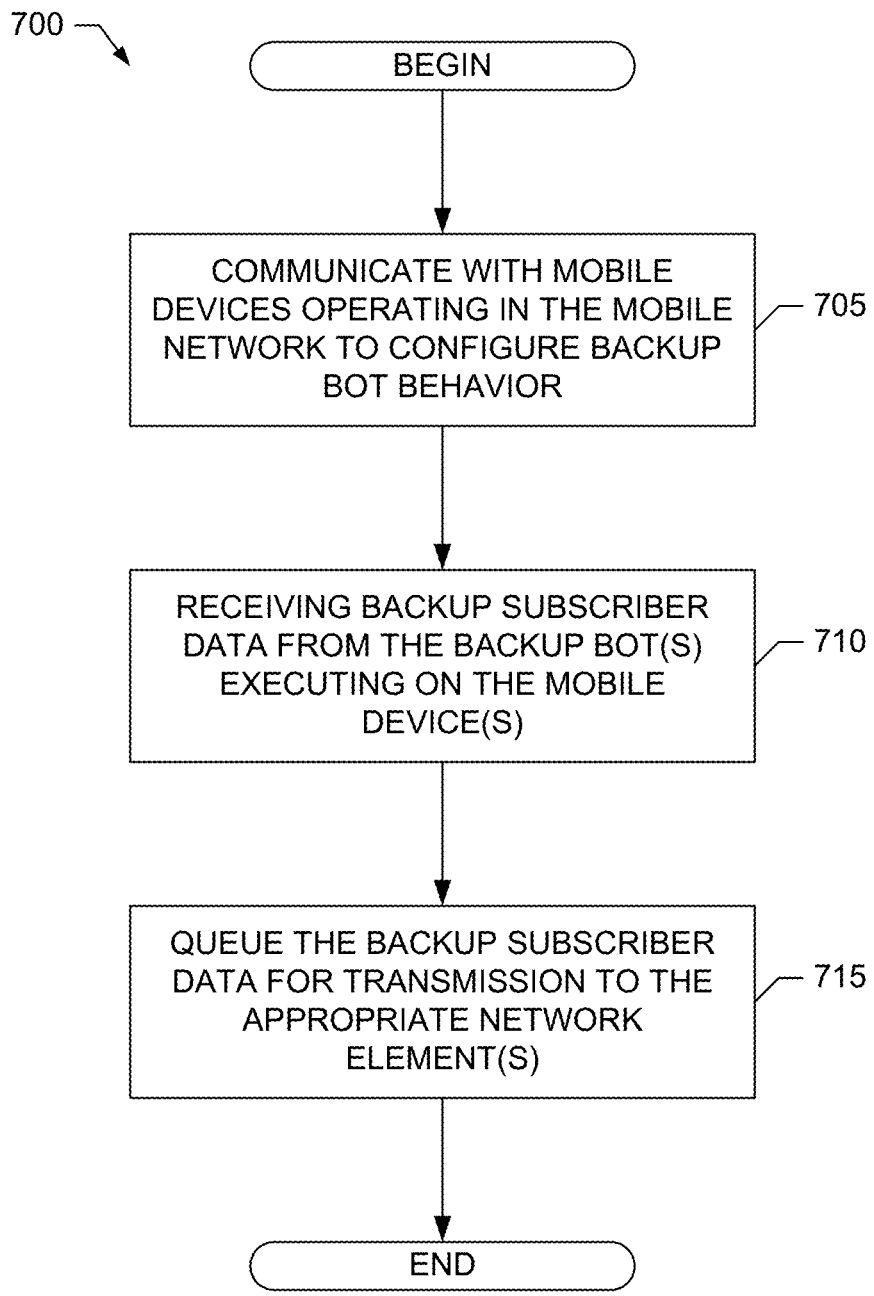
FIG. 7 is a flowchart representative of example machine readable instructions that may be executed to implement the example backup service of FIG. 4.
Figure 8:
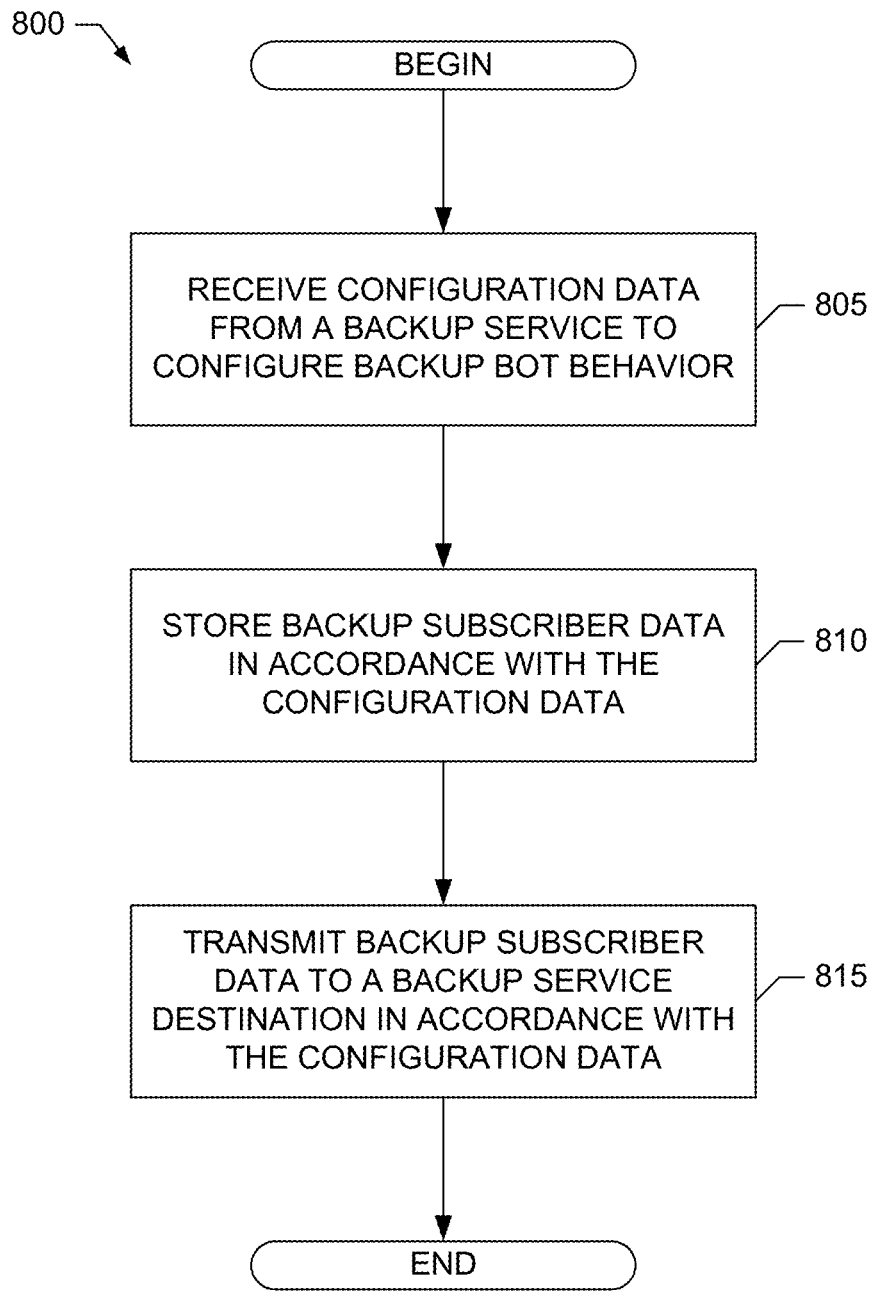
FIG. 8 is a flowchart representative of example machine readable instructions that may be executed to implement the example mobile device of FIG. 5.
Figure 9:
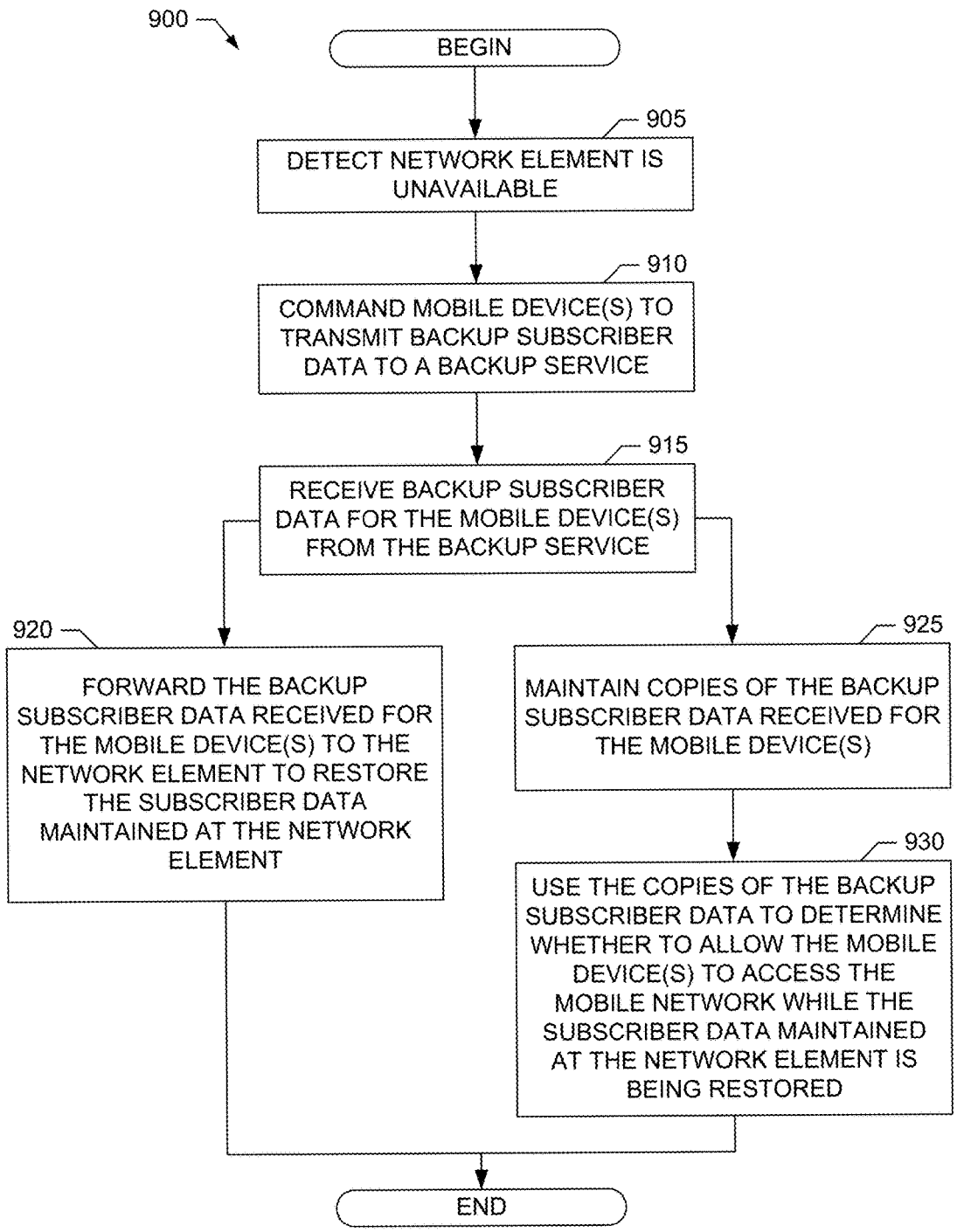
FIG. 9 is a flowchart representative of example machine readable instructions that may be executed to implement the example network element of FIG. 6.

Flowcharts representative of example machine readable instructions for implementing the example mobile network 100, the example eNB 105, the example mobile devices 110 and/or 110A-C, the example P/SGW 115, the example MME 120, the example HLR 125, the example HSS 130, the example backup service 135, the example network cloud 140, the example backup controller 145, the example data store 150, the example SIMs 155 and/or 155A-C, the network interface 405, the example backup bot controller 410, the example backup data receiver 415, the example network interface 505, the example backup bot 510, the example backup bot configurer 515, the example backup data storer 520, the example backup data reporter 525, the example HLR/HSS interface 605, the example eNB interface 610, the example backup service interface 615, the example data restorer 620, the example subscriber data storage 625 and/or the example access authorizer 630 are shown in FIGS. 7-9. In these examples, the machine readable instructions comprise one or more programs for execution by a processor, such as the processor 1012, 1112 and/or 1212 shown in the example processor platform 1000, 1100 and/or 1200 discussed below in connection with FIGS. 10-12. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1012, 1112 and/or 1212, but the entire program or programs and/or portions thereof could alternatively be executed by a device other than the processor 1012, 1112 and/or 1212, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 7-9, many other methods of implementing the example mobile network 100, the example eNB 105, the example mobile devices 110 and/or 110A-C, the example P/SGW 115, the example MME 120, the example HLR 125, the example HSS 130, the example backup service 135, the example network cloud 140, the example backup controller 145, the example data store 150, the example SIMs 155 and/or 155A-C, the network interface 405, the example backup bot controller 410, the example backup data receiver 415, the example network interface 505, the example backup bot 510, the example backup bot configurer 515, the example backup data storer 520, the example backup data reporter 525, the example HLR/HSS interface 605, the example eNB interface 610, the example backup service interface 615, the example data restorer 620, the example subscriber data storage 625 and/or the example access authorizer 630 may alternatively be used. For example, with reference to the flowcharts illustrated in FIGS. 7-9, the order of execution of the blocks may be changed, and/or some of the blocks described may be changed, eliminated, combined and/or subdivided into multiple blocks.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 700 that may be executed to implement the example backup service 135 of FIGS. 1-3 and/or 4 is represented by the flowchart shown in FIG. 7. For convenience and without loss of generality, execution of the example program 700 is described from the perspective of the example backup service 135 of FIG. 4 operating in the example mobile network 100 of FIGS. 1-3. With reference to the preceding figures and associated written descriptions, the example program 700 of FIG. 7 begins execution at block 705 at which the example backup bot controller 410 of the example backup controller 145 included in the backup service 135 communicates with mobile devices, such as the example mobile devices 110A-C, operating in the example mobile network 100 to configure backup bot behavior associated with the local storage and reporting of backup subscriber data, as disclosed above. At block 710, the example backup data receiver 415 of the backup controller 145 included in the backup service 135 receives, as disclosed above, respective backup subscriber data from respective mobile devices (e.g., as reported by the respective backup bots executing on and/or otherwise implemented by the respective mobile devices). At block 715, the received backup subscriber data is aggregated and queued at the example data store 150 included in the backup service 135 for transmission to the appropriate network elements, such as one or more of the example MME 120, the example HLR 125, the example HSS, etc., as disclosed above.

An example program 800 that may be executed to implement one or more of the example mobile devices 110 and/or 110A-C of FIGS. 1-3 and/or 5 is represented by the flowchart shown in FIG. 8. For convenience and without loss of generality, execution of the example program 800 is described from the perspective of the example mobile device 110 of FIG. 5 implementing the example mobile device 110A operating in the example mobile network 100 of FIGS. 1-3. With reference to the preceding figures and associated written descriptions, the example program 800 of FIG. 8 begins execution at block 805 at which the example backup bot configurer 515 of the example backup bot 510 included in the mobile device 110 receives configuration data from a backup service, such as the example backup service 135, to configure behavior of the backup bot 510, as disclosed above. For example, at block 805, the example backup bot configurer 515 uses the received configuration data to configure the example backup data storer 520 of the backup bot 510 to locally store backup subscriber data in the example SIM 155 of the mobile device 110, as disclosed above. At block 805, the example backup bot configurer 515 also uses the received configuration data to configure the example backup data reporter 525 to transmit the locally stored backup subscriber data to the backup service, as disclosed above.

At block 810, the data storer 520 of the backup bot 510 stores, as disclosed above, the backup subscriber data for the mobile device 110 in the SIM 155 in accordance with the configuration data received at block 805. At block 815, the backup data reporter 525 of the backup bot 510 transmits, as disclosed above, the locally stored backup subscriber data to the backup service 135 in accordance with the configuration data received at block 805.

An example program 900 that may be executed to implement the example MME 120 of FIGS. 1-3 and/or 6 is represented by the flowchart shown in FIG. 9. For convenience and without loss of generality, execution of the example program 900 is described from the perspective of the example MME 120 of FIG. 6 operating in the example mobile network 100 of FIGS. 1-3. With reference to the preceding figures and associated written descriptions, the example program 900 of FIG. 9 begins execution at block 905 at which the example data restorer 620 of the MME 120 detects that a network element maintaining subscriber data, such as the example HLR 125, the example HSS 130, etc., is unavailable, as disclosed above. At block 910, the data restorer 620 of the MME 120 requests, as disclosed above, the appropriate network element(s), such as the eNB 105, command mobile devices, such as the example mobile devices 110A-C, operating in their respective vicinities to transmit their respective locally stored backup subscriber data to a backup service, such as the example backups service 135. At block 915, the data restorer 620 of the MME 120 receives, as disclosed above, backup subscriber data for respective ones of the mobile devices from the backup service 135.

At block 920, the data restorer 620 of the MME 120 forwards, as disclosed above, the received backup subscriber data to the affected network element, such as the HLR 125, the HSS 130, etc., to restore the subscriber data maintained by that network element, thereby effecting recovery of that network element from a prior failure. In the illustrated example of FIG. 9, in parallel with the processing at block 920, at blocks 925 and 930 the MME 120 retains copies of the received backup subscriber data, and the example access authorizer 630 of the MME uses the copies of the backup subscriber data to determine whether to allow mobile devices, such as one or more of the mobile devices 110A-C, to access the mobile network 100 while the subscriber data maintained by the affected network element (e.g., the HLR 125, the HSS 130, etc.) is being restored, as disclosed above.

Figure 10:
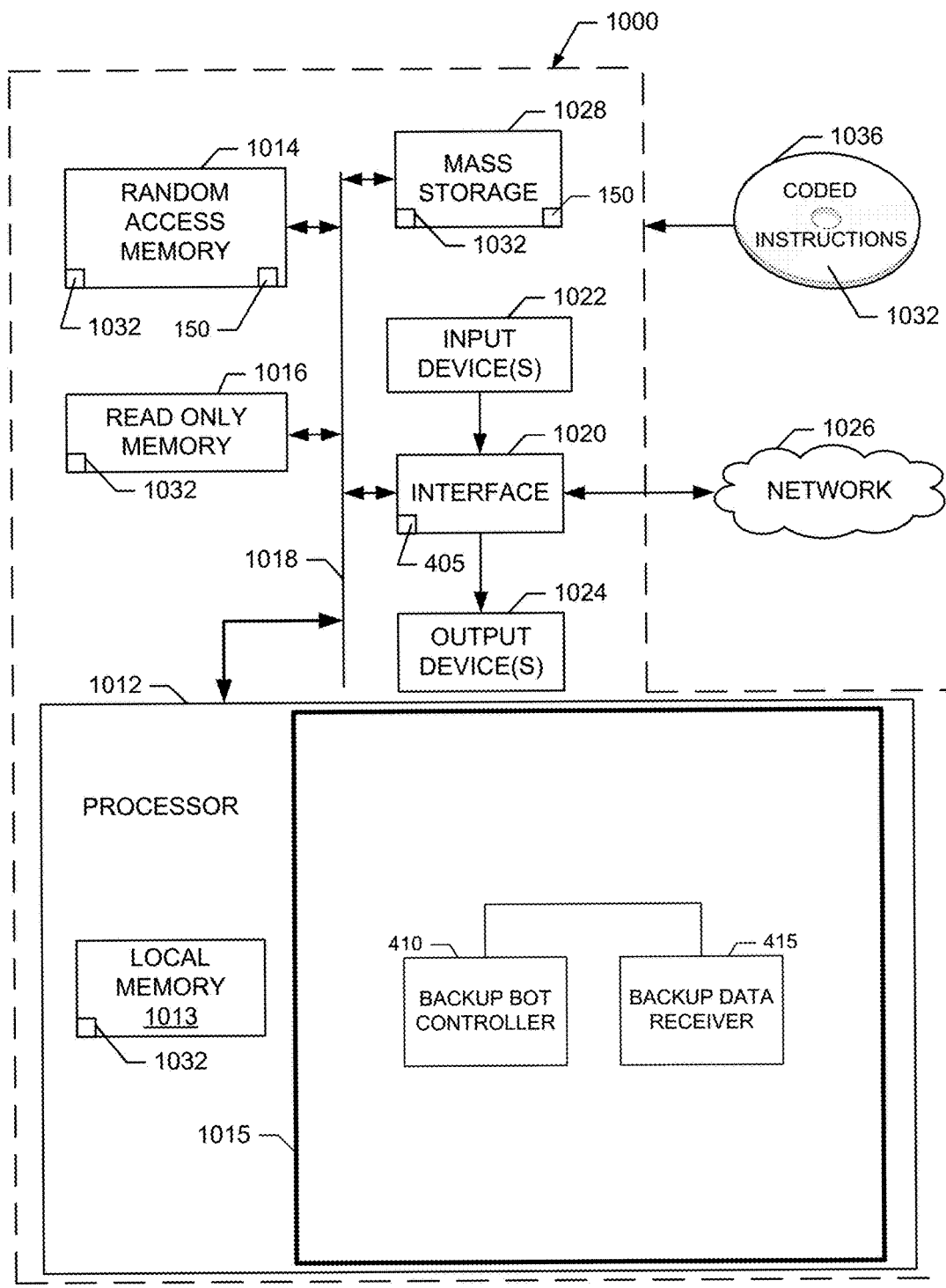
FIG. 10 is a block diagram of an example processor platform structured to execute the example machine readable instructions of FIG. 7 to implement the example backup service of FIG. 4.

FIG. 10 is a block diagram of an example processor platform 1000 structured to execute the instructions of FIG. 7 to implement the example backup service 135 of FIGS. 1-3 and/or 4. The processor platform 1000 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 includes one or more example processing cores 1015 configured via example instructions 1032, which include the example instructions of FIG. 7, to implement the example backup bot controller 410 and/or the example backup data receiver 415 of FIG. 4.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In the illustrated example of FIG. 10, the interface circuit 1020 is also structured to implement the example network interface 405 of FIG. 4.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives. In some examples, the mass storage device 1030 may implement the example data store 150. Additionally or alternatively, in some examples the volatile memory 1018 may implement the example data store 150.

Coded instructions 1032 corresponding to the instructions of FIG. 7 may be stored in the mass storage device 1028, in the volatile memory 1014, in the non-volatile memory 1016, in the local memory 1013 and/or on a removable tangible computer readable storage medium, such as a CD or DVD 1036.

Figure 11:
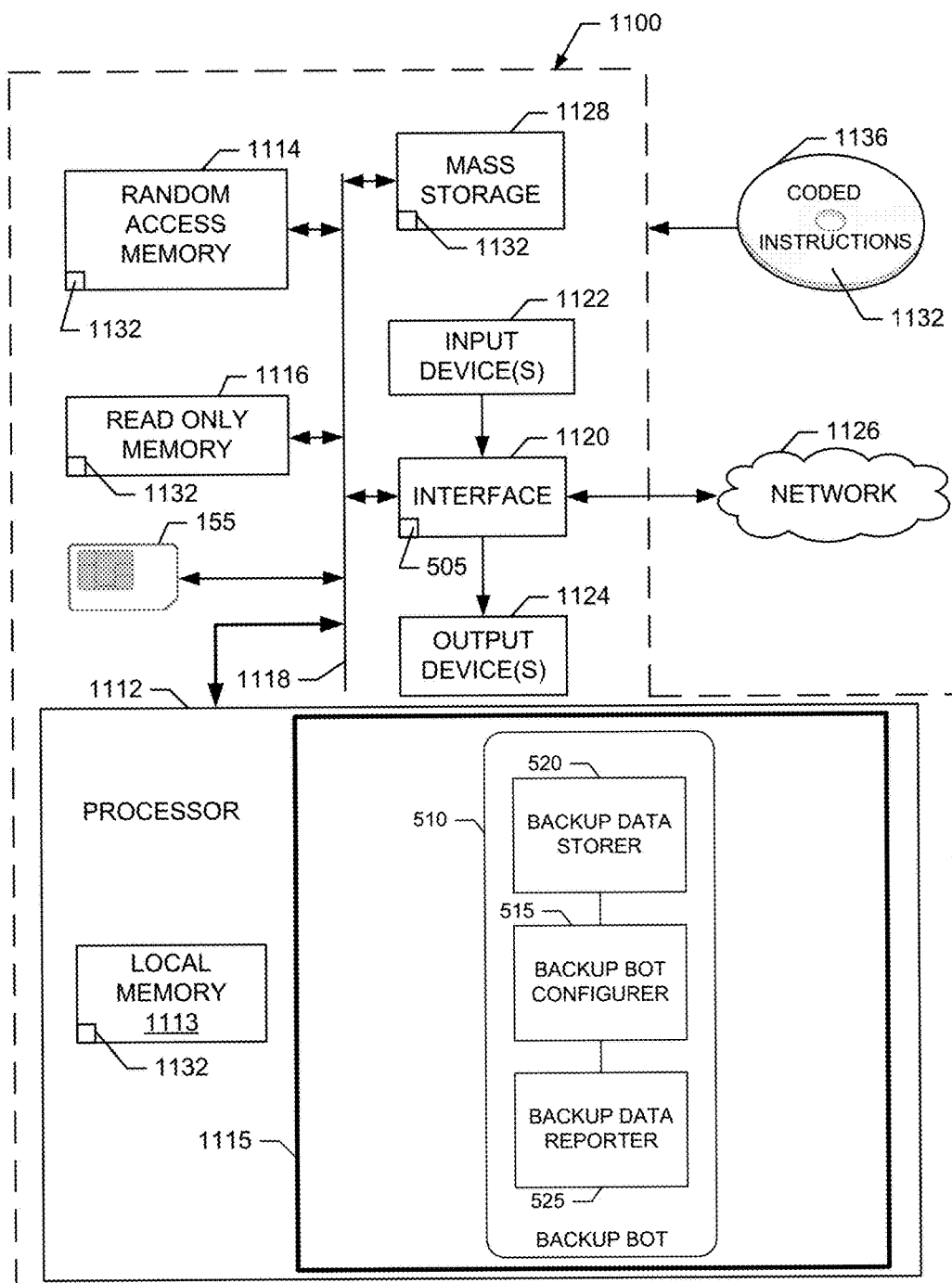
FIG. 11 is a block diagram of an example processor platform structured to execute the example machine readable instructions of FIG. 8 to implement the example mobile device of FIG. 5.

FIG. 11 is a block diagram of an example processor platform 1100 structured to execute the instructions of FIG. 8 to implement the example mobile device 110 of FIG. 5, which may implement one or more of the example mobile devices 110A-C of FIGS. 1, 2 and/or 3. The processor platform 1100 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 includes one or more example processing cores 1115 configured via example instructions 1132, which include the example instructions of FIG. 8, to implement the example backup bot 510, the example backup bot configurer 515, the example backup data storer 520 and/or the example backup data reporter 525 of FIG. 5.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED, an OLED, a liquid crystal display, a CRT, a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a DSL, a telephone line, coaxial cable, a cellular telephone system, etc.). In the illustrated example of FIG. 11, the interface circuit 1120 is also structured to implement the example network interface 505 of FIG. 5.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives.

Coded instructions 1132 corresponding to the instructions of FIG. 8 may be stored in the mass storage device 1128, in the volatile memory 1114, in the non-volatile memory 1116, in the local memory 1113 and/or on a removable tangible computer readable storage medium, such as a CD or DVD 1136.

Figure 12:
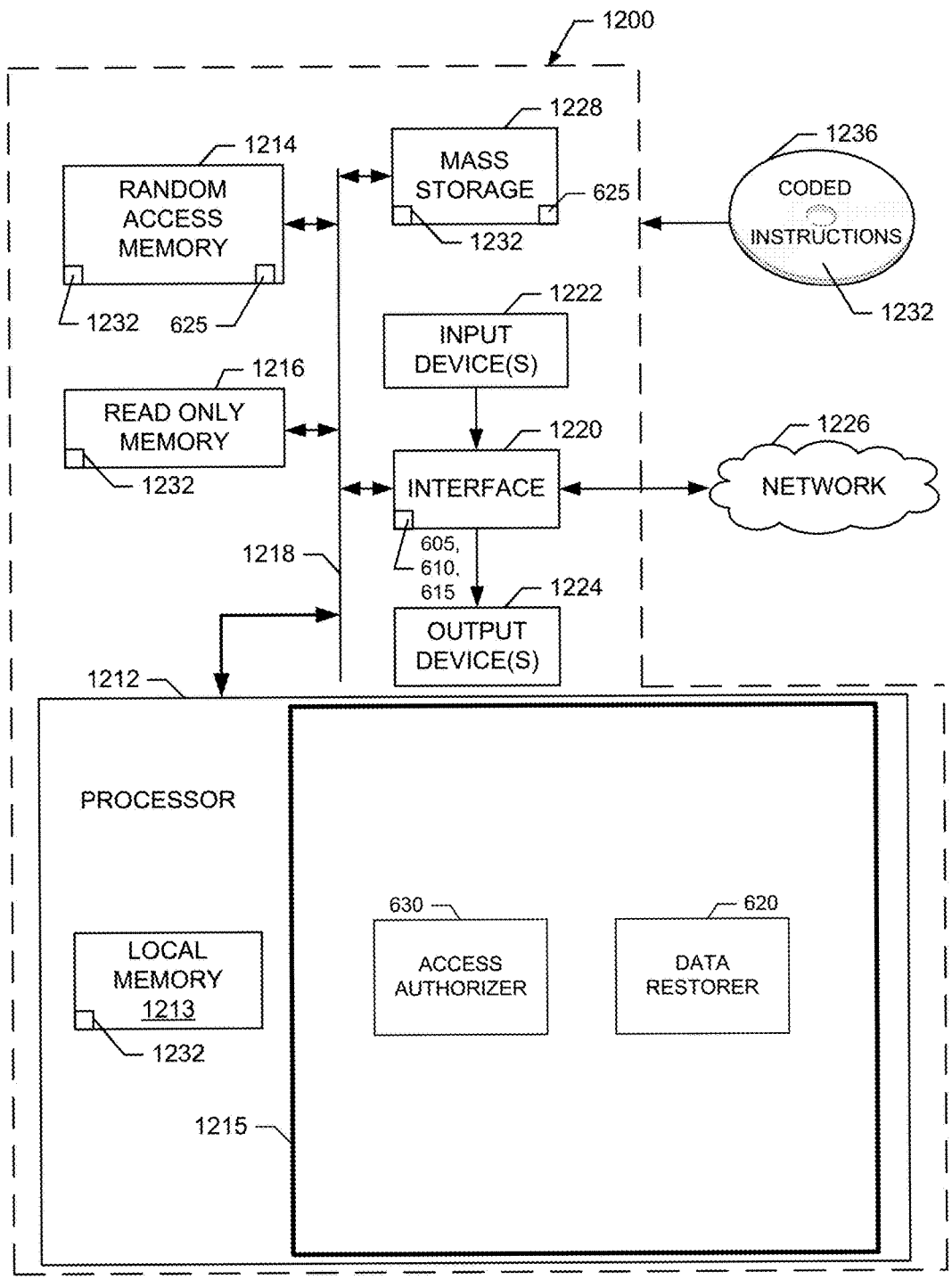
FIG. 12 is a block diagram of an example processor platform structured to execute the example machine readable instructions of FIG. 9 to implement the example network element of FIG. 6.

FIG. 12 is a block diagram of an example processor platform 1200 structured to execute the instructions of FIG. 9 to implement the example MME 120 of FIGS. 1-3 and/or 6. The processor platform 1200 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example of FIG. 12, the processor 1212 includes one or more example processing cores 1215 configured via example instructions 1232, which include the example instructions of FIG. 9, to implement the example data restorer 620 and/or the example access authorizer 630 of FIG. 6.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, a liquid crystal display, a CRT display, a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). In the illustrated example of FIG. 12, the interface circuit 1220 is also structured to implement one or more of the example interface 605, 610 and/or 615 of FIG. 6.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and DVD drives. In some examples, the mass storage device 1230 may implement the example subscriber data storage 625. Additionally or alternatively, in some examples the volatile memory 1218 may implement the example subscriber data storage 625.

Coded instructions 1232 corresponding to the instructions of FIG. 9 may be stored in the mass storage device 1228, in the volatile memory 1214, in the non-volatile memory 1216, in the local memory 1213 and/or on a removable tangible computer readable storage medium, such as a CD or DVD 1236.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A subscriber data recovery method comprising:
communicating, by executing an instruction with a processor, with a plurality of mobile devices operating in a mobile network to configure respective ones of the mobile devices to (1) locally store respective backup subscriber data in subscriber identity modules of the respective ones of the mobile devices, the respective backup subscriber data corresponding to subscriber data maintained at a first network element to manage mobile device access to the mobile network, and (2) repeatedly transmit the respective backup subscriber data from the subscriber identity modules of the respective ones of the mobile devices to a destination according to a reporting schedule based on first configuration data, the communicating with the plurality of mobile devices to configure respective ones of the mobile devices to locally store respective backup subscriber data in the subscriber identity modules including communicating second configuration data to a first one of the mobile devices that specifies (A) a first network location at which the first one of the mobile devices is to retrieve first persistent backup subscriber data for storage in a first subscriber identity module of the first one of the mobile devices, and (B) a second network location at which the first one of the mobile devices is to retrieve first temporary backup subscriber data for storage in the first subscriber identity module;
in response to detecting that the first network element is unavailable, commanding the respective mobile devices to transmit the respective backup subscriber data to the destination, and
queueing the respective backup subscriber data received at the destination from respective ones of the mobile devices for transmission to at least one of the first network element and a second network element to restore the subscriber data maintained at a first network element.

2. The method of claim 1, wherein the first network element corresponds to at least one of a home location register and a home subscriber server, the second network element corresponds to a mobility management entity, and the queueing of the respective backup subscriber data includes queueing the respective backup subscriber data for transmission to the mobility management entity.

3. The method of claim 1, wherein the destination corresponds to a cloud service, and further including communicating with the plurality of mobile devices to configure a destination address associated with the cloud service.

4. The method of claim 3, wherein the queueing of the respective backup subscriber data includes storing the respective backup subscriber data received from the respective ones of the mobile devices at a cloud data store; and further including pushing the respective backup subscriber data from the cloud data store to at least one of the first network element and the second network element according to a queueing schedule.

5. The method of claim 1, wherein the first configuration data further specifies that the backup subscriber data is to be transmitted in response to receipt of a message from a third network element providing an air interface of the mobile network.

6. The method of claim 5, wherein the third network element corresponds to an evolved Node-B.

7. The method of claim 1, wherein the first configuration data specifies that the backup subscriber data is to be transmitted to the destination repeatedly as a background process.

8. A tangible machine readable storage medium including machine readable instructions which, when executed, cause a machine to perform operations comprising:
communicating with a plurality of mobile devices operating in a mobile network to configure respective ones of the mobile devices to (1) locally store respective backup subscriber data in subscriber identity modules of the respective ones of the mobile devices, the respective backup subscriber data corresponding to subscriber data maintained at a first network element to manage mobile device access to the mobile network, and (2) repeatedly transmit the respective backup subscriber data from the subscriber identity modules of the respective ones of the mobile devices to a destination according to a reporting schedule based on first configuration data, the communicating with the plurality of mobile devices to configure respective ones of the mobile devices to locally store respective backup subscriber data in the subscriber identity modules including communicating second configuration data to a first one of the mobile devices that specifies (A) a first network location at which the first one of the mobile devices is to retrieve first persistent backup subscriber data for storage in a first subscriber identity module of the first one of the mobile devices, and (B) a second network location at which the first one of the mobile devices is to retrieve first temporary backup subscriber data for storage in the first subscriber identity module;
in response to detecting that the first network element is unavailable, commanding the respective mobile devices to transmit the respective backup subscriber data to the destination; and
queueing the respective backup subscriber data received at the destination from respective ones of the mobile devices for transmission to at least one of the first network element and a second network element to restore the subscriber data maintained at a first network element.

9. The tangible machine readable storage medium of claim 8, wherein the first network element corresponds to at least one of a home location register and a home subscriber server, the second network element corresponds to a mobility management entity, and the queueing of the respective backup subscriber data includes queueing the respective backup subscriber data for transmission to the mobility management entity.

10. The tangible machine readable storage medium of claim 8, wherein the destination corresponds to a cloud service, the operations further include communicating with the plurality of mobile devices to configure a destination address associated with the cloud service, the queueing of the respective backup subscriber data includes storing the respective backup subscriber data received from the respective ones of the mobile devices at a cloud data store, and the operations further include pushing the respective backup subscriber data from the cloud data store to at least one of the first network element and the second network element according to a queueing schedule.

11. The tangible machine readable storage medium of claim 8, wherein the first configuration data further specifies that the backup subscriber data is to be transmitted in response to receipt of a message from a third network element providing an air interface of the mobile network.

12. The tangible machine readable storage medium of claim 8, wherein the first configuration data specifies that the backup subscriber data is to be transmitted to the destination repeatedly as a background process.

13. An apparatus comprising:
memory including machine readable instructions; and
a processor to execute the machine readable instructions to perform operations including:
communicating with a plurality of mobile devices operating in a mobile network to configure respective ones of the mobile devices to (1) locally store respective backup subscriber data in subscriber identity modules of the respective ones of the mobile devices, the respective backup subscriber data corresponding to subscriber data maintained at a first network element to manage mobile device access to the mobile network, and (2) repeatedly transmit the respective backup subscriber data from the subscriber identity modules of the respective ones of the mobile devices to a destination according to a reporting schedule based on first configuration data, the communicating with the plurality of mobile devices to configure respective ones of the mobile devices to locally store respective backup subscriber data in the subscriber identity modules including communicating second configuration data to a first one of the mobile devices that specifies (A) a first network location at which the first one of the mobile devices is to retrieve first persistent backup subscriber data for storage in a first subscriber identity module of the first one of the mobile devices, and (B) a second network location at which the first one of the mobile devices is to retrieve first temporary backup subscriber data for storage in the first subscriber identity module;
in response to detecting that the first network element is unavailable, commanding the respective mobile devices to transmit the respective backup subscriber data to the destination; and
queueing the respective backup subscriber data received at the destination from respective ones of the mobile devices for transmission to at least one of the first network element and a second network element to restore the subscriber data maintained at a first network element.

14. The apparatus of claim 13, wherein the first network element corresponds to at least one of a home location register and a home subscriber server, the second network element corresponds to a mobility management entity, and the queueing of the respective backup subscriber data includes queueing the respective backup subscriber data for transmission to the mobility management entity.

15. The apparatus of claim 13, wherein the destination corresponds to a cloud service, the operations further include communicating with the plurality of mobile devices to configure a destination address associated with the cloud service, the queueing of the respective backup subscriber data includes storing the respective backup subscriber data received from the respective ones of the mobile devices at a cloud data store, and the operations further include pushing the respective backup subscriber data stored at the cloud data store to at least one of the first network element and the second network element according to a queueing schedule.

16. The apparatus of claim 13, wherein the first configuration data further specifies that the backup subscriber data is to be transmitted in response to receipt of a message from a third network element providing an air interface of the mobile network.

17. The apparatus of claim 13, wherein the first configuration data specifies that the backup subscriber data is to be transmitted to the destination repeatedly as a background process.

* * * * *